(12) United States Patent
Geissler et al.

(10) Patent No.: US 12,425,731 B2
(45) Date of Patent: Sep. 23, 2025

(54) CAMERA FOCUS CONTROL

(71) Applicant: Mo-Sys Engineering Limited, London (GB)

(72) Inventors: Michael Geissler, London (GB); James Uren, London (GB)

(73) Assignee: Mo-Sys Engineering Limited, London (GB)

( * ) Notice: Subject to any disclaimer, the term of this patent is extended or adjusted under 35 U.S.C. 154(b) by 0 days.

(21) Appl. No.: 18/005,894

(22) PCT Filed: Jul. 23, 2021

(86) PCT No.: PCT/GB2021/051907
§ 371 (c)(1),
(2) Date: Jan. 18, 2023

(87) PCT Pub. No.: WO2022/018455
PCT Pub. Date: Jan. 27, 2022

(65) Prior Publication Data
US 2023/0336870 A1    Oct. 19, 2023

(30) Foreign Application Priority Data
Jul. 24, 2020 (GB) ..................... 2011524

(51) Int. Cl.
*H04N 23/67* (2023.01)
*H04N 5/275* (2006.01)
(Continued)

(52) U.S. Cl.
CPC .......... *H04N 23/675* (2023.01); *H04N 5/275* (2013.01); *H04N 23/66* (2023.01); *H04N 23/81* (2023.01)

(58) Field of Classification Search
CPC ...... H04N 23/66; H04N 23/675; H04N 23/81; H04N 5/2224; H04N 5/272; H04N 5/275
See application file for complete search history.

(56) References Cited

U.S. PATENT DOCUMENTS 5,227,828 A    7/1993 Kirigaya
6,646,687 B1   11/2003 Vlahos
(Continued)

FOREIGN PATENT DOCUMENTS

JP    H02118610 A    5/1990
JP    H0329472 A     2/1991
(Continued)

OTHER PUBLICATIONS

International Search Report and Written Opinion for International Patent Application No. PCT/GB2021/051907, mailed Oct. 25, 2021.
(Continued)

*Primary Examiner* — Antoinette T Spinks
(74) *Attorney, Agent, or Firm* — Andrus Intellectual Property Law, LLP

(57) ABSTRACT

A controller for a video camera, the controller comprising: an input for receiving a focus command indicative of a focus distance; and one or more outputs for transmitting a first signal for controlling the focus of a lens of the camera and a second signal indicative of the focus distance indicated by the focus command; the controller being configured to determine a focus limit and to transmit the first signal so as to command the camera to adjust its focus to the distance indicated by the focus command only if that distance does not exceed the focus limit.

17 Claims, 1 Drawing Sheet

(51) Int. Cl.
*H04N 23/66* (2023.01)
*H04N 23/81* (2023.01)

(56) References Cited

U.S. PATENT DOCUMENTS

| | | | |
|---|---|---|---|
| 7,006,155 B1* | 2/2006 | Agarwala | H04N 5/272 348/592 |
| 9,041,899 B2* | 5/2015 | Stout | G03B 15/10 352/88 |
| 11,425,283 B1* | 8/2022 | Thurston, III | G06T 7/13 |
| 2005/0195311 A1 | 9/2005 | Sasaki | |
| 2010/0157127 A1* | 6/2010 | Takayanagi | H04N 23/63 348/E5.022 |
| 2013/0182225 A1* | 7/2013 | Stout | G03B 15/10 352/89 |
| 2018/0146131 A1 | 5/2018 | Kikuchi et al. | |
| 2020/0073206 A1 | 3/2020 | Fogarty | |
| 2020/0145644 A1 | 5/2020 | Cordes | |
| 2020/0228721 A1 | 7/2020 | Kurisu | |
| 2023/0186550 A1* | 6/2023 | Thurston, III | G06T 5/92 345/419 |

FOREIGN PATENT DOCUMENTS

| | | |
|---|---|---|
| JP | 2005252680 A | 9/2005 |
| JP | 2011173609 A | 9/2011 |
| JP | 2018055134 A | 4/2018 |
| JP | 2020095275 A | 6/2020 |

OTHER PUBLICATIONS

Combined Search and Examination Report Under Sections 17 and 18(3) for UK Patent Application No. GB2110618.2, mailed Nov. 12, 2021.
Examination Report Under Section 18(3) for UK Patent Application No. GB2110618.2, mailed Jan. 6, 2022.
Examination Report Under Section 18(3) for UK Patent Application No. GB2110618.2, mailed Aug. 8, 2022.
Examination Report Under Section 18(3) for UK Patent Application No. GB2110618.2, mailed Nov. 7, 2022.
Notice of Reasons for Refusal for Japanese Patent Application No. 2023-503131, dated Jan. 27, 2025.
Communication Pursuant to Article 94(3) EPC for European Patent Application No. 21751852.1, dated Apr. 2, 2025.

* cited by examiner

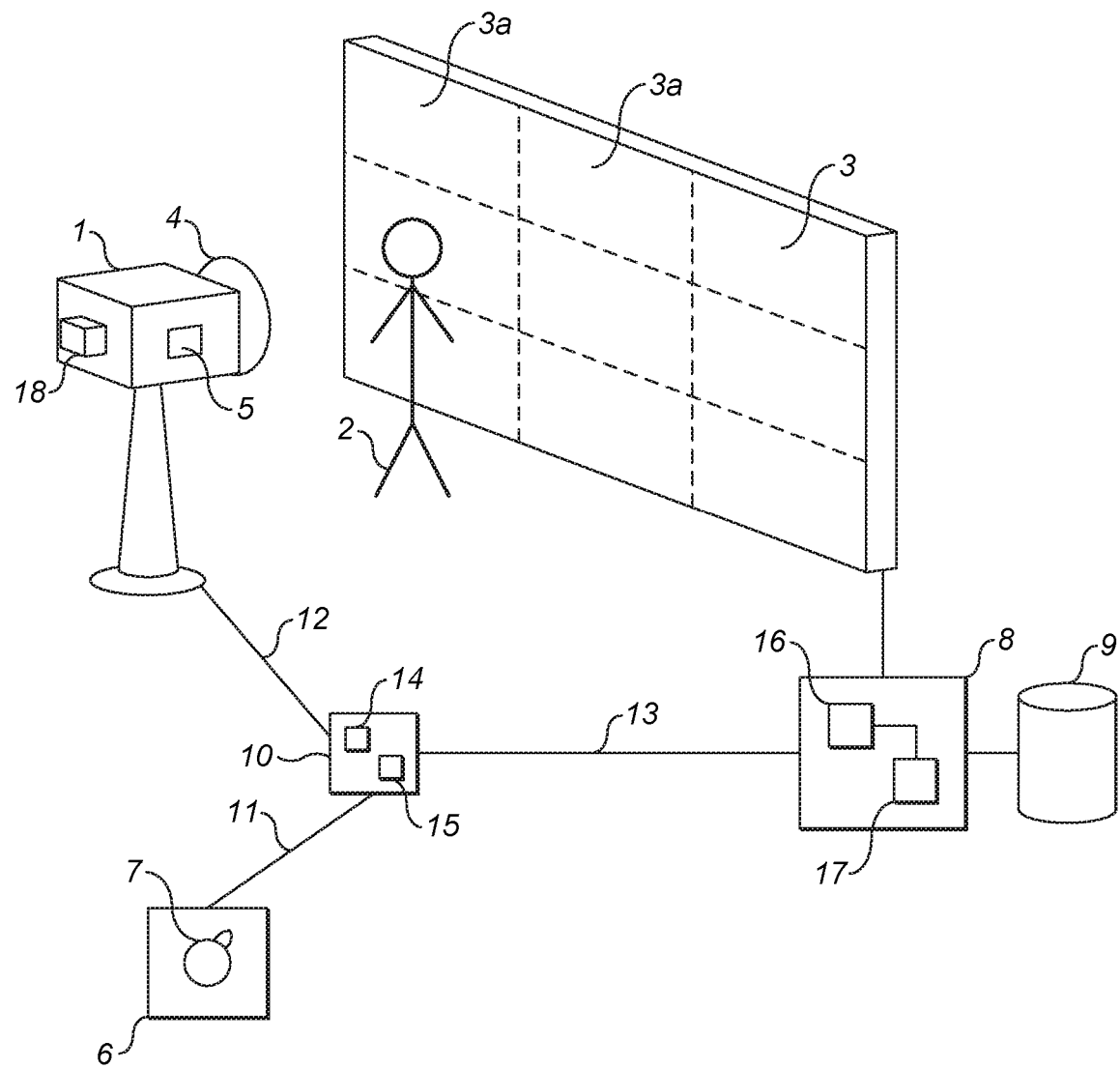

CAMERA FOCUS CONTROL

CROSS-REFERENCE TO RELATED APPLICATIONS

This application is the U.S. national stage application of International Application PCT/GB2021/051907, filed Jul. 23, 2021, which international application was published on Jan. 27, 2022, as International Publication WO 2022/018455 A1 in the English language. The international application is incorporated herein by reference, in entirety. The international application claims priority to GB Patent Application No. 2011524.2, filed Jul. 24, 2020, which is incorporated herein by reference, in entirety.

This invention relates to controlling one or more of (i) the focusing operations of a camera and (ii) the operation of a controllable backdrop.

It is known to shoot video of a subject against a backdrop of a known colour, typically green, and to then edit the video to replace the original background with a still image or a video. This can give the impression that the subject is in a different environment. For example, the subject can be videoed in a studio against a green background, and then the video can be edited to replace the green background with a beach scene. This approach requires post-processing of the captured video, which can require a significant amount of data processing. Inaccuracies in the replacement process can occur, especially if the subject contains the same colour as the background.

An alternative approach is to use a screen as the background, to display a still image or a video on the screen, and to video the subject against the screen with a stationary or moving camera. The screen can be a plain screen onto which the still image or video is projected, or it can be display device or an array of display devices. This approach can reduce the amount of post processing that is needed, but it requires a display system to present the background on the display—typically a graphics engine—at the location where the video is shot.

It would be desirable to be able to enhance or better control the quality with which video can be shot against a display background.

According to one approach there is provided apparatus and methods as set out in the accompanying claims.

The present invention will now be described by way of example with reference to the accompanying drawings.

IN THE DRAWINGS

FIG. 1 shows apparatus for capturing video of a subject against a dynamic background.

In the system of FIG. 1 a camera 1 is located so as to capture video of a subject 2 against a display wall 3. The system is configured so that focus of the camera is controlled in dependence on the relative locations of the camera and the display wall. The system is also configured so that the image on the display can be blurred depending on a focus setting for the camera. The image may be a still image or a frame of a video.

The system will now be described in more detail.

Camera 1 is capable of capturing video. It has a lens 4 whose focal point can be adjusted by motor 5. It has an image sensor (not shown) for sensing an image. An image sensed by the sensor can be stored by the camera or transmitted by the camera for storage or display elsewhere. The camera may have another motor for adjusting the lens's depth of field. The field of view and/or aperture of the lens may be independently adjustable, optionally using other motors.

The focus of the camera may be controlled by an operator at the camera. This option will be discussed in more detail below. Alternatively, the operator of the camera may control the direction of the camera and a focus puller may control the camera's focus using follow-focus 6 which is remote from the camera. The follow focus comprises a knob 7 or other input device by which the focus puller can provide inputs to control the focus of the camera.

A display controller 8 controls the still image or video shown on screen 3. The display controller is linked to a data store 9 which stores still and/or video data (which may in each case be photographic or computer-generated) to be displayed.

In this example the display wall 3 is composed of an array of display screens 3a. Alternatively it could be a screen on to which images are projected.

Conventionally, the focus controller 6 is connected directly to the camera 1 by a wired or wireless link. In the system of FIG. 1 the follow-focus communicates with the camera via a link device 10. The link device receives focus commands from the follow-focus over a link 11 and forwards at least some of those commands to both the camera 1 and the display controller 8 over links 12 and 13 respectively. Each of links 11 to 13 may independently be a wired or a wireless link. In one convenient embodiment, the link device presents the same logical and/or physical interface to the follow focus as the camera 1 presents. In one convenient embodiment, the link device presents the same logical and/or physical interface to the camera as the follow-focus presents. One or both of these features can mean that the link device can readily be interposed between a pre-existing camera and follow-focus. Alternatively, the follow-focus may be adapted to work with the link device.

The link device 10 and the display controller 8 together provide a mechanism for controlling aspects of the camera 1 and image(s) that are displayed on the display wall 3. Link device 10 may comprise a processor 14 and a memory 15 storing in a non-transient way code executable by the processor to cause the link device to perform a set of the operations described herein. Display controller 8 may comprise a processor 16 and a memory 17 storing in a non-transient way code executable by the processor 16 to cause the display controller to perform a set of the operations described herein. The split of functions between the link device and the display controller can be chosen in any convenient way, and may be shared with other devices not shown in FIG. 1.

The operation of the system of FIG. 1 will now be described.

Subject 2 performs between the display wall 3 and the camera 1. The camera is operated so that the subject falls within the camera's field of view. The camera then captures video of the subject with the appearance of the display wall as a backdrop.

In a simple example of focus control, it may be desired for the captured video to be focused on the subject. As the subject moves with respect to the camera, which may arise when the subject moves or the camera is moved, the focus puller adjusts the follow-focus 6. The follow-focus sends control signals to cause the motor 5 of the camera to adjust the lens 4 of the camera so the camera maintains focus on the subject. These signals are forwarded unchanged to the camera by the link device 10. In a second example, it may be desired for the focus of the video captured by the camera to appear to scan from the subject to an object that is displayed on the display wall 3. The focus puller adjusts the follow-focus to cause it to send signals that are such as to command the focus of the camera to shift from the subject to the object. The subject is positioned closer to the display wall 3 than the camera. The object is displayed on the display wall and appears to be further from the camera than the display wall. The focus command signals from the follow-focus are processed by the link device 10. If the focus command signal from the follow-focus commands the camera's focus to be in the range from the camera to the display wall, then the link device passes that signal to the camera. The motor 5 causes the focus of the camera to change in dependence on the signal received by the camera. If the focus command signal from the follow-focus commands the camera's focus to be more distant from the camera than the display wall then the link device does not pass that signal to the camera, and signals the display controller 16 with the desired focus position. The display controller then performs an image processing operation on the image(s) it is displaying on the display wall 3 to adapt its appearance in dependence on the desired focus position. For example, it may apply a blur to portions of the image(s) other than those that are intended to appear at the distance from the camera that corresponds to the desired focus position. Since the focus of the camera is kept on the display wall, the camera can accurately capture the appearance of the display wall.

The opposite can be done when a series of commands is generated to move the focus of the camera from a location beyond the display wall to a location between the display wall and the camera.

The same principals described above may be achieved in the following alternative way. The camera 1 may be adapted to implement a focus limit or cap on the distance at which the camera lens focusses. The link device 10 may determine this limit or cap depending on the distance between the camera and the display wall. The link device may then send this limit to the camera 1 which acts as an upper bound on the camera motor 5 so that the focus of the camera lens can only be adjusted up to and including that cap or limit. For example, if the camera were positioned 10 m away from the display wall, the limit on the focus distance of the camera lens would be capped at 10 m. The camera motor would adjust the focus of the lens according to the distance required by any command from the follow-focus below the cap or limit. If the follow-focus command exceeded the limit, then the focus of the camera lens would stop once it reached the limit of 10 m and would then remain focused at 10 m on the display wall. The link device may send the same command from the follow-focus to the display controller, which would adjust the screen accordingly so that the focus was now on the virtual object. In this set up, the link device transmits the follow-focus command to the camera, along with the determined limit. If the camera 1 does not move, and assuming the display wall is stationary, the distance between the camera and the display wall remains the same, so the limit does not need to be re-sent with every new command from the follow-focus. The limit sent to the camera by the link device is dependent on the position of the camera, which may be calculated in any appropriate way. If the position of the camera 1 changes, the limit may need to be accordingly adjusted.

When focus is commanded to be beyond the display wall, in practice the display controller 8 may select a range of virtual distances for displayed objects that are not to be blurred. For example, if focus is set at 20 m, objects at a virtual distance between 18 m and 22 m might not be blurred and objects at distances outside that range may be blurred. The depth of the range that is not blurred may be dependent on the current depth of field of the lens 4, which may be signalled to the link device 10.

In order to control the blurring of the display wall in dependence on the desired focus position, the display controller 8 can use information indicating the distances from the camera of subject matter in regions of the display. Information indicating the distances may be pre-stored with the data in store 9. Alternatively the distance information may be inferred by the display controller 8, e.g. using a trained distance estimation algorithm. The blurring of the display wall by the display controller 8 may be dependent on information indicating the distance of the camera 1 from the display wall. The position of the camera 1 may be sensed by a location sensor 18 on the camera and signalled to the display controller. The display controller may have pre-stored the location of the display wall 3 so it can determine the distance of the camera from the display wall. Alternatively, in many situations the distance of the camera from the wall may be small relative to the virtual distance from the camera to an object shown on the display wall so satisfactory results may be obtained by assuming a distance (e.g. 10 m) from the camera to the display wall.

A camera position sensed by sensor 18 may also be signalled to link device 10 and used together with knowledge of the location of the display wall 3 to determine at what depth to limit the camera's focus.

The position of the camera may be estimated in any convenient way. For example there could be a sensor on the camera that senses fiducial markers, beacons or other features in the environment of the camera, and processing circuitry on the camera or remote from it may use the data from that sensor to estimate the camera's position. Alternatively, the camera could carry a marker or beacon that may be sensed by one or more sensors in the environment, and processing circuitry could then use the output of such sensor(s) to estimate the location of the camera. The absolute location of the camera may be estimated. Alternatively the location of the camera relative to the screen may be estimated.

Depending on the direction of the camera's principal axis relative to the surface of the display wall, on whether the display wall is planar or not (it could, for example be curved or faceted) and on the field of view of the camera, some parts of the display wall that are within the field of view of the camera could be at different distances from the camera to each other. It is preferable for all those parts of the display wall to be in focus when the set focus of the camera is more distant than the display wall. To achieve that, the link device 10 may receive from the camera information indicating the camera's depth of field. That may be a direct indication of the depth of field or an indication of the aperture setting of lens 4 and an indication of the type of lens 4 from which the link device 10 may infer the depth of field using pre-stored information on the characteristics of lens 4. The link device may receive from location sensor 18 the location and orientation of the camera 1. The link device may receive from the camera a zoom setting of lens 4. The link device may perform a geometric calculation to estimate the range of distances from the camera of those parts of the display wall as are within the field of view of the camera. The link device may then, when the camera's focus is intended to be on the display wall, signal the camera so as to adjust its depth of field (e.g. by extending its depth of field and/or adjusting the aperture of the lens) to maintain the whole of the display wall within its field of view in focus.

When the display wall is displayed in a pixelated manner, for example when it is constituted by an array of display screens, it is possible for Moiré patterns to be captured by the camera due to interactions between the apparent spacing of the grid of pixels on the display screen and pixels on an image sensor of the camera. The link device may be configured to mitigate such effects. The link device may be configured to estimate focal configurations of the camera at which such effects are likely to occur. This may be estimated in dependence on information about the relative location of the camera and the display wall and the lens setting of the camera, all of which can be obtained as described above, and information about the pixel spacings of the camera and the display wall, which may be provided in advance to the link device. The link device may then avoid the camera dwelling in focus configurations for which Moiré is likely to occur. It may do this by, when the follow-focus commands the camera to adopt such a configuration, commanding the camera to instead adopt a configuration in which the focus is long or short of that configuration.

In the embodiment described above the follow-focus is remote from the camera. Instead, focus commands could be provided by a focus controller integral with the camera. The link device 10 could be integrated with the camera or part of it, for example the lens.

The devices 1, 10, 6, 8 may be coupled by dedicated or by shared interfaces on the respective devices. For example, an output from link device 10 to display controller 8 may be constituted by a dedicated physical interface on link device 10 or by the link device transmitting signals addressed to display controller 8.

The link device 10 may forward to the display controller all focus commands received from the follow-focus 6, or may forward such commands only when the focus of the camera is commanded to be at or beyond the screen 3.

The embodiment discussed above may be convenient to implement because there may be no need to adapt the focus controller and/or the camera. The device 10 can simply be interposed between the two. Alternatively, where the camera is adapted to receive a focus limit, the control of the motor of the camera can be capped by this limit.

The device 10 may control the focus of the lens in a number of ways. Once a focus limit has been determined, commands from the focus controller 6 to focus the camera at a distance beyond that limit may simply not be forwarded to the camera. Alternatively, such commands may be adapted by device 10 to be commands to focus the camera at the limit and then forwarded to the camera. Alternatively, the device 10 may signal the limit to the camera and the camera itself may then block focusing beyond that limit. The device 10 may forward both the limit and the focus puller command distance, and the camera 1 may focus using the lower of the two distances. In each case, the functions of the camera may be performed by any relevant parts of the camera, including the lens.

The focus of the camera lens should ideally be adjustable in response to both a new focus controller command and in response to movement of the camera itself. As previously mentioned, the position of the camera in front of the display wall is monitored with a camera position sensor 18. There may be a situation where the focus command from the focus controller remains fixed on a virtual object on the display wall whilst the camera moves around in front of the display wall. For example, the camera is positioned 20 m away from the display wall, and the focus puller is focused on an object at 30 m away, so the focus command has surpassed the display wall by 10 m and the camera has been set to focus at 20 m. If the camera were to move forward by 5 m, it may be the case that the camera does not receive any indication to adjust the lens focus, because the focus puller's command is still to focus on the virtual image at 10 m from the display wall which has remained stationary. This would leave the camera no longer focused on the display wall because it moved forward by 5 m. In order for the focus of the camera to remain on the display wall, the location of the camera must be known so that the focus of camera lens can be adjusted to remain on the wall if it is detected that the camera has moved position.

In the examples described above, the screen is one that can adaptively display information, and that information can be captured by the camera during filming. The information may be displayed by being emitted from light emitting devices on the screen (as in the case of an LED wall) or by being projected on to and reflected from the wall. Alternatively, the wall may be a screen suitable for chroma keying to replace the parts of an image that include the screen with other information. Such a chroma key screen may be of a colour that is separable from the subject 2, for example a so-called green screen or a so-called blue screen. The screen may be of a single hue.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A focus control interface for operably coupling with a user input device, a focus controller and a display controller, the focus control interface comprising:
   an input for receiving, from the user input device a focus command indicative of a focus distance for a camera lens capturing images of a screen; and
   one or more outputs for transmitting (i) a first signal indicative of the focus command to the focus controller for controlling a focus setting of the camera lens in response to receiving the focus command and (ii) a second signal indicative of the focus distance indicated by the focus command to the display controller for controlling the images shown on the screen;
   the focus control interface being configured to determine the first and second signals in response to:
   receiving the focus command; and
   a focus limit determined by the focus control interface which is dependent on a distance between the camera lens and the screen such that the focus setting of the camera lens is adjustable up to and including the focus limit,
   wherein the focus controller is configured to adjust the focus setting of the camera in response to receiving the first signal and wherein the display controller is configured to adapt the appearance of an image being shown on the screen in response to receiving the second signal.

2. The focus control interface as claimed in claim 1, being configured to, when the focus setting indicated by the focus command exceeds the focus limit, transmit the first signal to the focus controller so as to set the focus setting of the camera lens to the distance indicated by the focus limit.

3. The focus control interface as claimed in claim 1, comprising a wireless data interface for receiving the focus command and transmitting the first signal and wherein the focus command and the first signal are of the same format.

4. The focus control interface of claim 1, being configured to transmit a third signal indicative of the determined focus limit to the focus controller.

5. The focus control interface of claim 1, further being configured to determine the distance between the camera lens and the screen in response to a received position of the camera lens and a location of the screen.

6. A video capture system comprising:
a user input device for receiving a focus control input for a camera lens capturing images of a screen;
a focus control interface as claimed in claim 1, for determining a first and second signal in response to receiving the focus command and upon a focus limit which is dependent on a distance between the camera lens and the screen;
a focus controller for controlling a focus setting of the camera lens in response to receiving the first signal from the focus control interface;
a display controller for controlling images shown on the screen in response to receiving the second signal from the focus control interface;
wherein the focus controller is configured to adjust the focus setting of the camera in response to receiving the first signal and wherein the display controller is configured to adapt the appearance of an image being shown on the screen in response to receiving the second signal.

7. The video capture system as claimed in claim 6, wherein the focus control interface is responsive to the focus command from the user input device to:
when the user input device commands adjustment of the focus setting of the camera lens in a distance range between the camera lens and the screen to signal the focus controller to adjust the focus setting of the camera lens; and
when the user input device commands adjustment of the focus setting of the camera lens outside the range between the camera lens and the screen to not signal the focus controller to adjust the focus setting of the camera lens.

8. The video capture system as claimed in claim 7, wherein the focus control interface is responsive to the focus control input from the user input device to:
when the user input device commands adjustment of the focus setting of the camera lens in the range between the video camera and the screen to signal the display controller to alter the image being displayed on the screen, and optionally wherein the focus controller is configured to implement a cap on the focus setting of the camera lens in response to receiving a focus limit from the focus control interface.

9. The video capture system as claimed in claim 7, further comprising a location sensor configured to sense the position of the camera lens and to send the sensed position of the camera lens to the focus control interface or the display controller.

10. The video capture system as claimed in claim 7, further comprising the camera lens, the screen and a focus control system implemented by one or more processors configured to execute pre-stored program code to:
receive a focus command indicative of a focus setting for a camera lens;
determine a focus limit;
only if the focus setting is less than the focus limit, signal the focus controller to adjust the focus setting of the camera lens to the focus setting indicated by the focus command; and
otherwise, signal the display controller to apply a blur to part of an image to form a blurred image and to transmit the blurred image to be displayed on the screen.

11. The video capture system as claimed in claim 10, wherein the screen is a display screen.

12. The video capture system as claimed in claim 10, wherein the screen is a chroma key screen.

13. The video capture system as claimed in claim 11, wherein the display controller is configured to estimate in dependence on depth information describing the depths of subject matter in the image and the focus setting indicated by the focus command a part of the image containing subject matter that is not at the focus setting and to apply a blur to that part of the image.

14. The video capture system as claimed in claim 13, wherein the display controller is configured to:
receive depth information representing a depth of field of the camera lens;
estimate in dependence on the received depth information, the focus setting and the depth of field those parts of the image containing subject matter that is outside the depth of field with respect to the focus setting and apply a blur to those parts of the image.

15. The video capture system as claimed in claim 14, wherein the display controller is configured to:
receive information representing the relative location of the camera lens and the display screen; and
estimate in dependence on the depth information, the focus setting, the depth of field and the relative location of the camera lens and the display screen, those parts of the image containing subject matter that is outside the depth of field with respect to the focus setting and apply a blur to those parts of the image.

16. A method of video capture comprising:
receiving a focus command indicative of a focus setting for a camera lens capturing images of a screen;
determining a focus limit in dependence on a distance between the camera lens and the screen; and
if the focus command is to adopt a focal setting less than the focus limit, causing the camera lens to adopt that focal setting; and
otherwise, to cause the camera lens to adopt a focal setting at the focus limit and to apply a blur to parts of an image being displayed on the screen.

17. The video capture method as claimed in claim 16, comprising selecting the parts of the image to be blurred in dependence on depth information describing the depth of subject matter contained in those parts of the image.

* * * * *